United States Patent
Tanioka et al.

(10) Patent No.: US 7,030,880 B2
(45) Date of Patent: Apr. 18, 2006

(54) INFORMATION PROCESSOR

(75) Inventors: Yasuhisa Tanioka, Tokyo (JP); Junya Tsutsumi, Tokyo (JP); Kazuo Kawabata, Tokyo (JP); Kazutoshi Oda, Tokyo (JP)

(73) Assignee: Hi Corporation, Tokyo (JP)

( * ) Notice: Subject to any disclaimer, the term of this patent is extended or adjusted under 35 U.S.C. 154(b) by 611 days.

(21) Appl. No.: 10/344,452

(22) PCT Filed: Jun. 20, 2002

(86) PCT No.: PCT/JP02/06159

§ 371 (c)(1),
(2), (4) Date: Feb. 12, 2003

(87) PCT Pub. No.: WO03/001458

PCT Pub. Date: Jan. 3, 2003

(65) Prior Publication Data

US 2003/0185460 A1   Oct. 2, 2003

(30) Foreign Application Priority Data

Jun. 21, 2001  (JP) .............................. 2001-187619

(51) Int. Cl.
*G06T 15/10* (2006.01)

(52) U.S. Cl. ...................... 345/427; 345/419; 345/581; 345/422; 345/586; 345/643; 345/644; 382/251; 382/276

(58) Field of Classification Search ................. 345/419, 345/422, 427, 582, 586, 643, 644, 648; 382/251, 382/276
See application file for complete search history.

(56) References Cited

U.S. PATENT DOCUMENTS 5,748,793 A   5/1998   Sanpei

FOREIGN PATENT DOCUMENTS

| JP | 6-77842 A | 3/1994 |
| JP | 7-78269 A | 3/1995 |
| JP | 7-99578 A | 4/1995 |
| JP | 9-305789 A | 11/1997 |

*Primary Examiner*—Kimbinh T. Nguyen
(74) *Attorney, Agent, or Firm*—Sughrue Mion, PLLC

(57) ABSTRACT

In an information processing apparatus for conducting an affine transformation representative of $$\begin{pmatrix} x' \\ y' \\ z' \end{pmatrix} = A \begin{pmatrix} x \\ y \\ z \end{pmatrix} + \begin{pmatrix} t_1 \\ t_2 \\ t_3 \end{pmatrix},$$

a matrix $$A' = \begin{pmatrix} a'_{11} & a'_{12} & a'_{13} \\ a'_{21} & a'_{22} & a'_{23} \\ a'_{31} & a'_{32} & a'_{33} \end{pmatrix} = \lambda A = \begin{pmatrix} \lambda a_{11} & \lambda a_{12} & \lambda a_{13} \\ \lambda a_{21} & \lambda a_{22} & \lambda a_{23} \\ \lambda a_{31} & \lambda a_{32} & \lambda a_{33} \end{pmatrix}$$

obtained by multiplying a matrix A for the affine transformation by $\lambda(\neq 0)$ is stored in a memory section in advance. In case of conducting calculation processing for transforming coordinates $(x,y,z)^t$ into coordinates $(x',y',z')^t$ by means of the affine transformation, A' and a matrix $(t_1, t_2, t_3)^t$ are read from the memory section, $x' = (a'_{11}*x + a'_{12}*y + a'_{13}*z)/\lambda + t_1;$ $y' = (a'_{21}*x + a'_{22}*y + a'_{23}*z)/\lambda + t_2;$ $z' = (a'_{31}*x + a'_{32}*y + a'_{33}*z)/\lambda + t_3;$ are calculated, and the coordinates $(x',y',z')^t$ are obtained.

32 Claims, 3 Drawing Sheets

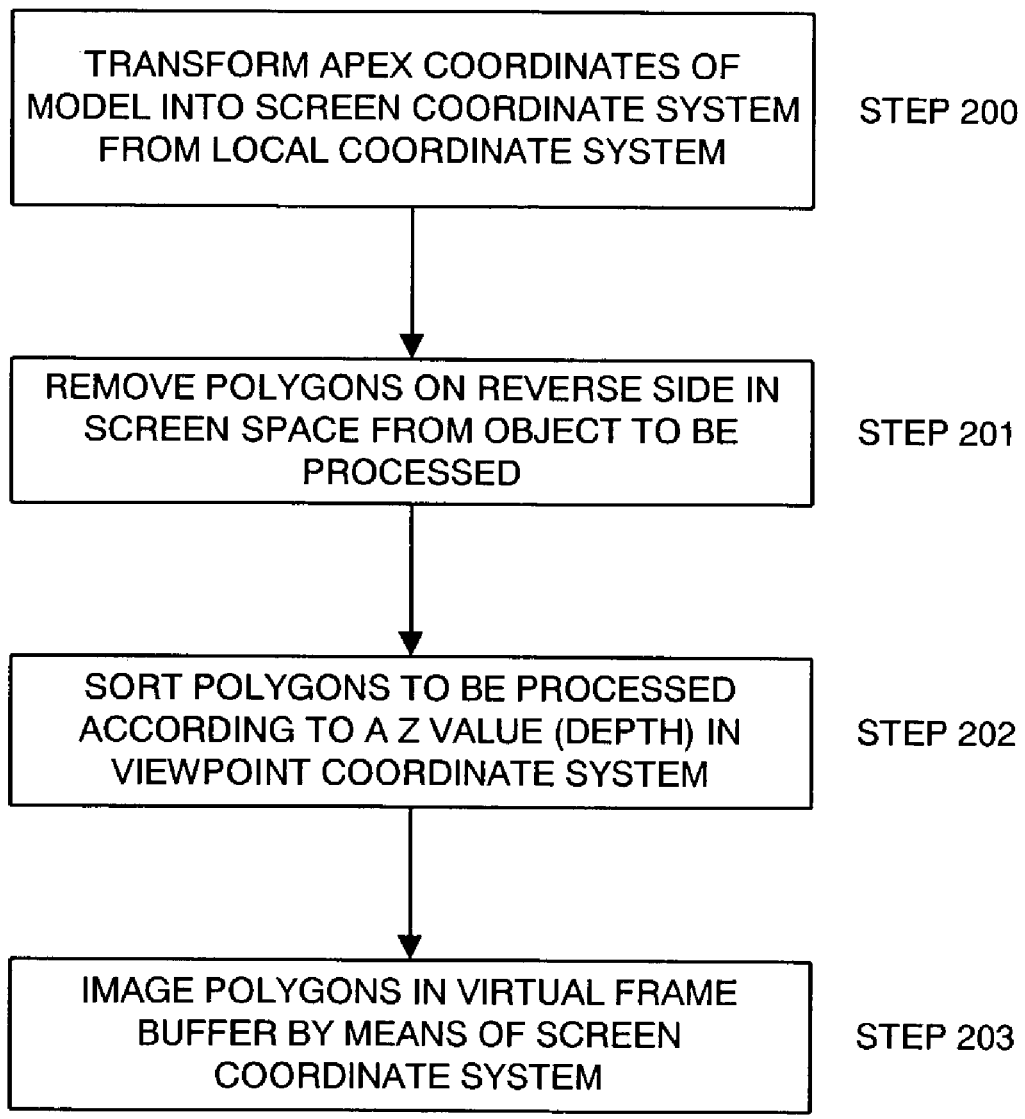

INFORMATION PROCESSOR

TECHNICAL FIELD

The present invention relates to a technology of the imaging of a three-dimensional image, and especially, to a technology for reducing geometry calculation and processing of division which are conducted in processing of the imaging of the three-dimensional image, and realizing the imaging of three-dimensional graphics even in an information processing apparatus which does not have an FPU (floating-point processing unit) and an information processing apparatus which has low throughput of a CPU.

BACKGROUND TECHNOLOGY

In case of imaging three-dimensional graphics, an information processing terminal conducts
(1) coordinate transformation calculation (Transformation) for shifting a three-dimensional object,
(2) light source calculation processing (Lighting) for calculating a part which is being sunned and a part which is being shaded, assuming that light from a light source (the sun and so forth, for example) is shining upon an object,
(3) processing (Rasterize) for dividing an object into columns that are called dots,
(4) processing (Texture mapping) for mapping texture into the columns, and so forth.

Usually, a CPU of an information processing apparatus itself takes charge of work of what is called geometry calculation of (1) and (2), and conducts the processing utilizing an FPU (floating-point processing unit) of the CPU.

Further, the processing of what is called rasterize of (3) and (4) is usually conducted a 3D graphics accelerator.

However, although the work of what is called the geometry calculation of (1) and (2) is conducted by utilizing the FPU (floating-point processing unit) of the CPU, the FPU is designed so as to conduct not only the geometry calculation but also the calculation of a general floating-point, and in addition, the CPU conducts other processing, it is not necessarily suitable for the processing of the imaging of the three-dimensional graphics.

Accordingly, a 3D graphics accelerator designed so as to conduct the geometry calculation by means of a graphics chip (in other words, in which a geometry engine is build) appears, and it devises to lower a load rate of a CPU, and in addition, the capacity of the geometry calculation can be drastically improved above all, in other words, the imaging capacity of 3D can be improved, compared with a case where it is conducted by the CPU.

However, the 3D graphics accelerator is expensive, and it is not equipped with all information processing apparatuses.

Further, in the information processing apparatuses, there is one which does not have not only the 3D graphics accelerator but also an FPU (floating-point processing unit), like in a mobile telephone and PDA (Personal Digital (Data) Assistants) for example.

In such an information processing apparatus, generally the capacity of the CPU is also low, and it is said that the 3D graphics is hardly possible.

Further, the speed of division processing is much lower than that of multiplication processing, and in order to conduct calculation processing at a high speed, it is preferable to reduce the division as much as possible.

Therefore, the objective of the present invention is to provide a technology for realizing the imaging of the three-dimensional graphics even in the information processing apparatus which does not have the FPU (floating-point processing unit) by conducting integer calculation processing in the geometry calculation that is conducted in the processing of the imaging of the three-dimensional graphics.

Also, the objective of the present invention is to provide a technology for realizing the imaging of the three-dimensional graphics at a high speed even in the information processing apparatus which has the CPU having low processing capacity by conducting rasterize processing without conducting division in the rasterize processing.

DISCLOSURE OF THE INVENTION

The first invention for accomplishing the above-described objective is an information processing apparatus for, in conducting Rasterize processing of imaging of a three-dimensional image, calculating a quantity of a change of x coordinates $$\Delta x = \frac{x_2 - x_1}{y_2 - y_1}$$

to y coordinates of a straight line passing through a point $P_1(x_1,y_1)$ and a point $P_2(x_2,y_2)$ on a two-dimensional plain, characterized in that the apparatus comprises:

a memory in which a constant μ representative of $$\mu = \frac{\lambda}{y_2 - y_1}$$

is stored in association with the quantity of the change of the y coordinates; and calculation means for, in calculating Δx, reading μ corresponding to the quantity of the change of said y coordinates from said memory, and calculating $$\Delta x' = \mu * (x_2 - x_1);$$

by means of multiplication, and calculating this result as Δx.

The second invention for accomplishing the above-described objective is, in the above-described first invention, characterized in that said λ is limited to $2^n (n \geq 1)$, and the apparatus further comprises means for calculating Δx by right-shifting said calculated Δx' by n digits.

The third invention for accomplishing the above-described objective is, in the above-described first invention or second invention, wherein coordinate values are limited to integers, and transformation processing is applied to coordinates $(x,y,z)^t$ to create coordinates $(x',y',z')^t$ by means of an affine transformation representative of $$\begin{pmatrix} x' \\ y' \\ z' \end{pmatrix} = A \begin{pmatrix} x \\ y \\ z \end{pmatrix} + \begin{pmatrix} t_1 \\ t_2 \\ t_3 \end{pmatrix},$$

characterized in that the apparatus further comprises:

a memory in which a matrix $$A' = \begin{pmatrix} a'_{11} & a'_{12} & a'_{13} \\ a'_{21} & a'_{22} & a'_{23} \\ a'_{31} & a'_{32} & a'_{33} \end{pmatrix} = \lambda A = \begin{pmatrix} \lambda a_{11} & \lambda a_{12} & \lambda a_{13} \\ \lambda a_{21} & \lambda a_{22} & \lambda a_{23} \\ \lambda a_{31} & \lambda a_{32} & \lambda a_{33} \end{pmatrix}$$

that is obtained by multiplying an affine transformation matrix $$A = \begin{pmatrix} a_{11} & a_{12} & a_{13} \\ a_{21} & a_{22} & a_{23} \\ a_{31} & a_{32} & a_{33} \end{pmatrix}$$

by $\lambda(\neq 0)$, a matrix $(t_1, t_2, t_3)^t$, and a shape data are stored; and calculation means for, in transforming the coordinates $(x,y,z)^t$ of said shape data into the coordinates $(x',y',z')^t$ by means of an affine transformation of the matrix A and the matrix $(t_1, t_2, t_3)^t$, reading the matrix A' and the matrix $(t_1, t_2, t_3)^t$ from said memory, and calculating $x'=(a'_{11}*x+a'_{12}*y+a'_{13}*z)/\lambda+t_1;$ $y'=(a'_{21}*x+a'_{22}*y+a'_{23}*z)/\lambda+t_2;$ $z'=(a'_{31}*x+a'_{32}*y+a'_{33}*z)/\lambda+t_3;$ to calculate the coordinates $(x',y',z')^t$.

The fourth invention for accomplishing the above-described objective is, in the above-described third invention, characterized in that said $\lambda$ is limited to $2^n (n \geq 1)$, and said calculation means is means for calculating divisional calculation of $x'=(a'_{11}*x+a'_{12}*y+a'_{13}*z)/\lambda+t_1;$ $y'=(a'_{21}*x+a'_{22}*y+a'_{23}*z)/\lambda+t_2;$ $z'=(a'_{31}*x+a'_{32}*y+a'_{33}*z)/\lambda+t_3;$ by conducting right-shifting by n digits.

The fifth invention for accomplishing the above-described objective is, in the above-described fourth invention, characterized in that said calculation means is means for conducting the calculation by conducting right-shifting by n digits after adding a constant $\lambda/2$ to each number to be divided.

The sixth invention for accomplishing the above-described objective is, in the above-described third, fourth or fifth invention, characterized in that the apparatus comprises synthesis means for synthesizing two or more parameters that are multiplied by $\lambda(\neq 0)$ in advance.

The seventh invention for accomplishing the above-described objective is, an imaging processing method of, in conducting Rasterize processing of imaging of a three-dimensional image, calculating a quantity of a change of x coordinates $$\Delta x = \frac{x_2 - x_1}{y_2 - y_1}$$

to y coordinates of a straight line passing through a point $P_1(x_1, y_1)$ and a point $P_2(x_2, y_2)$ on a two-dimensional plain, characterized in that said method comprises steps of:

in calculating $\Delta x$, reading $\mu$ corresponding to a quantity of a change of y coordinates of $\Delta x$ to be calculated, from a memory in which the constant $\mu$ representative of $$\mu = \frac{\lambda}{y_2 - y_1}$$

is stored in association with the quantity of the change of the y coordinates; and based on said $\mu$ that was read, calculating $\Delta x' = \mu * (x_2 - x_1);$ by means of multiplication, and calculating this result as $\Delta x$.

The eighth invention for accomplishing the above-described objective is, in the above-described seventh invention, characterized in that, said $\lambda$ is limited to $2^n (n \geq 1)$, and the method further comprises a step of calculating $\Delta x$ by right-shifting said calculated $\Delta x'$ by n digits.

The ninth invention for accomplishing the above-described objective is, in the above-described seventh or eighth invention, in which coordinate values are limited to integers, and transformation processing is applied to coordinates $(x,y,z)^t$ to create coordinates $(x',y',z')^t$ by means of an affine transformation representative of $$\begin{pmatrix} x' \\ y' \\ z' \end{pmatrix} = A \begin{pmatrix} x \\ y \\ z \end{pmatrix} + \begin{pmatrix} t_1 \\ t_2 \\ t_3 \end{pmatrix},$$

characterized in that the method comprises steps of:
in transforming the coordinates $(x,y,z)^t$ of a shape data into the coordinates $(x',y',z')^t$ by means of an affine transformation of a matrix A and a matrix $(t_1, t_2, t_3)^t$, reading a parameter A'

$$A' = \begin{pmatrix} a'_{11} & a'_{12} & a'_{13} \\ a'_{21} & a'_{22} & a'_{23} \\ a'_{31} & a'_{32} & a'_{33} \end{pmatrix} = \lambda A = \begin{pmatrix} \lambda a_{11} & \lambda a_{12} & \lambda a_{13} \\ \lambda a_{21} & \lambda a_{22} & \lambda a_{23} \\ \lambda a_{31} & \lambda a_{32} & \lambda a_{33} \end{pmatrix}$$

that is obtained by multiplying the matrix A by $\lambda (\neq 0)$, and the matrix $(t_1, t_2, t_3)^t$, which are stored in a memory; and based on said read matrix A' and matrix $(t_1, t_2, t_3)^t$, calculating $x'=(a'_{11}*x+a'_{12}*y+a'_{13}*z)/\lambda+t_1;$ $y'=(a'_{21}*x+a'_{22}*y+a'_{23}*z)/\lambda+t_2;$ $z'=(a'_{31}*x+a'_{32}*y+a'_{33}*z)/\lambda+t_3;$ and calculating the coordinates $(x',y',z')^t$.

The tenth invention for accomplishing the above-described objective is, in the above-described ninth invention, characterized in that said $\lambda$ is limited to $2^n (n \geq 1)$, and said calculating step is a step of calculating division of $x'=(a'_{11}*x+a'_{12}*y+a'_{13}*z)/\lambda+t_1;$ $y'=(a'_{21}*x+a'_{22}*y+a'_{23}*z)/\lambda+t_2;$ $z'=(a'_{31}*x+a'_{32}*y+a'_{33}*z)/\lambda+t_3;$ by conducting right-shifting by n digits to calculate the coordinates $(x',y',z')^t$.

The eleventh invention for accomplishing the above-described objective is, in the above-described tenth invention, characterized in that the method further comprises a step of adding a constant $\lambda/2$ to each number to be divided before conducting said right-shifting by n digits.

The twelfth invention for accomplishing the above-described objective is, in the above-described tenth or eleventh invention, characterized in that the method further comprises a step of synthesizing two or more parameters that are multiplied by $\lambda(\neq 0)$ in advance.

The thirteenth invention for accomplishing the above-described objective is a program for, in conducting Rasterize processing of imaging of a three-dimensional image, making an information processing apparatus conduct calculation processing for calculating a quantity of a change of x coordinates $$\Delta x = \frac{x_2 - x_1}{y_2 - y_1}$$

to y coordinates of a straight line passing through a point $P_1(x_1,y_1)$ and a point $P_2(x_2,y_2)$ on a two-dimensional plain, characterized in that said program comprises steps of:

in calculating $\Delta x$, reading $\mu$ corresponding to a quantity of a change of y coordinates of $\Delta x$ to be calculated, from a memory in which the constant $\mu$ representative of $$\mu = \frac{\lambda}{y_2 - y_1}$$

is stored in association with the quantity of the change of the y coordinates; and based on said $\mu$ that was read, calculating $$\Delta x' = \mu * (x_2 - x_1);$$

by means of multiplication, and calculating this result as $\Delta x$.

The fourteenth invention for accomplishing the above-described objective is, in the above-described thirteenth invention, characterized in that, in the information processing apparatus, said $\lambda$ is limited to $2^n (n \geq 1)$, and the program further comprises a step of calculating $\Delta x$ by right-shifting said calculated $\Delta x'$ by n digits.

The fifteenth invention for accomplishing the above-described objective is, in the above-described thirteenth or fourteenth invention, in making an information processing apparatus apply transformation processing to coordinates $(x,y,z)^t$ to create coordinates $(x',y',z')^t$ by means of an affine transformation representative of $$\begin{pmatrix} x' \\ y' \\ z' \end{pmatrix} = A \begin{pmatrix} x \\ y \\ z \end{pmatrix} + \begin{pmatrix} t_1 \\ t_2 \\ t_3 \end{pmatrix},$$

wherein coordinate values are limited to integers, characterized in that the program comprises steps of:

in transforming the coordinates $(x,y,z)^t$ of the shape data into the coordinates $(x',y',z')^t$ by means of an affine transformation of a matrix A and a matrix $(t_1,t_2,t_3)^t$, reading a parameter A'

$$A' = \begin{pmatrix} a'_{11} & a'_{12} & a'_{13} \\ a'_{21} & a'_{22} & a'_{23} \\ a'_{31} & a'_{32} & a'_{33} \end{pmatrix} = \lambda A = \begin{pmatrix} \lambda a_{11} & \lambda a_{12} & \lambda a_{13} \\ \lambda a_{21} & \lambda a_{22} & \lambda a_{23} \\ \lambda a_{31} & \lambda a_{32} & \lambda a_{33} \end{pmatrix}$$

that is obtained by multiplying the matrix A by $\lambda$ ($\neq 0$), and the matrix $(t_1,t_2,t_3)^t$, which are stored in a memory; and based on said read matrix A' and matrix $(t_1,t_2,t_3)^t$, calculating $$x' = (a'_{11}*x + a'_{12}*y + a'_{13}*z)/\lambda + t_1;$$

$$y' = (a'_{21}*x + a'_{22}*y + a'_{23}*z)/\lambda + t_2;$$

$$z' = (a'_{31}*x + a'_{32}*y + a'_{33}*z)/\lambda + t_3;$$

to calculate the coordinates $(x',y',z')^t$.

The sixteenth invention for accomplishing the above-described objective is, in the above-described fifteenth invention, characterized in that, in case that said $\lambda$ is limited to $2^n (n \geq 1)$, said calculating step in said program is a step of, in the information processing apparatus, calculating division of $$x' = (a'_{11}*x + a'_{12}*y + a'_{13}*z)/\lambda + t_1;$$

$$y' = (a'_{21}*x + a'_{22}*y + a'_{23}*z)/\lambda + t_2;$$

$$z' = (a'_{31}*x + a'_{32}*y + a'_{33}*z)/\lambda + t_3;$$

by conducting right-shifting by n digits to calculate the coordinates $(x',y',z')^t$.

The seventeenth invention for accomplishing the above-described objective is, in the above-described sixteenth invention, characterized in that, in the information processing apparatus, the program further comprises a step of adding a constant $\lambda/2$ to each number to be divided before conducting said right-shifting by n digits.

The eighteenth invention for accomplishing the above-described objective is, in the above-described fifteenth, sixteenth and seventeenth invention, characterized in that, in the information processing apparatus, the program further comprises a step of synthesizing two or more parameters that are multiplied by $\lambda(\neq 0)$ in advance.

The nineteenth invention for accomplishing the above-described objective is a record medium in which a program for, in conducting Rasterize processing of imaging of a three-dimensional image, making an information processing apparatus conduct calculation processing for calculating a quantity of a change of x coordinates $$\Delta x = \frac{x_2 - x_1}{y_2 - y_1}$$

to y coordinates of a straight line passing through a point $P_1(x_1,y_1)$ and a point $P_2(x_2,y_2)$ on a two-dimensional plain, characterized in that said program comprises steps of:

in calculating Δx, reading μ corresponding to a quantity of a change of y coordinates of Δx to be calculated, from a memory in which the constant μ representative of $$\mu = \frac{\lambda}{y_2 - y_1}$$

is stored in association with the quantity of the change of the y coordinates; and based on said μ that was read, calculating $$\Delta x' = \mu * (x_2 - x_1);$$

by means of multiplication, and calculating this result as Δx.

The twentieth invention for accomplishing the above-described objective is, in the above-described nineteenth invention, characterized in that, in the information processing apparatus, said λ is limited to $2^n (n \geq 1)$, and the program further comprises a step of calculating Δx by right-shifting said calculated Δx' by n digits.

The twenty-oneth invention for accomplishing the above-described objective is, in the above-described nineteenth or twentieth invention, in making an information processing apparatus apply transformation processing to coordinates $(x,y,z)^t$ to create coordinates $(x',y',z')^t$ by means of an affine transformation representative of $$\begin{pmatrix} x' \\ y' \\ z' \end{pmatrix} = A \begin{pmatrix} x \\ y \\ z \end{pmatrix} + \begin{pmatrix} t_1 \\ t_2 \\ t_3 \end{pmatrix},$$

wherein coordinate values are limited to integers, characterized in that the program comprises steps of:

in transforming the coordinates $(x,y,z)^t$ of the shape data into the coordinates $(x',y',z')^t$ by means of an affine transformation of a matrix A and a matrix $(t_1,t_2,t_3)^t$, reading a parameter A'

$$A' = \begin{pmatrix} a'_{11} & a'_{12} & a'_{13} \\ a'_{21} & a'_{22} & a'_{23} \\ a'_{31} & a'_{32} & a'_{33} \end{pmatrix} = \lambda A = \begin{pmatrix} \lambda a_{11} & \lambda a_{12} & \lambda a_{13} \\ \lambda a_{21} & \lambda a_{22} & \lambda a_{23} \\ \lambda a_{31} & \lambda a_{32} & \lambda a_{33} \end{pmatrix}$$

that is obtained by multiplying the matrix A by λ (≠0), and the matrix $(t_1,t_2,t_3)^t$, which are stored in a memory; and based on said read matrix A' and matrix $(t_1,t_2,t_3)^t$, calculating $$x' = (a'_{11} * x + a'_{12} * y + a'_{13} * z)/\lambda + t_1;$$

$$y' = (a'_{21} * x + a'_{22} * y + a'_{23} * z)/\lambda + t_2;$$

$$z' = (a'_{31} * x + a'_{32} * y + a'_{33} * z)/\lambda + t_3;$$

to calculate the coordinates $(x',y',z')^t$.

The twenty-twoth invention for accomplishing the above-described objective is, in the above-described twenty-oneth invention, characterized in that, in case that said λ is limited to $2^n (n \geq 1)$, said calculating step in said program is a step of, in the information processing apparatus, calculating division of $$x' = (a'_{11} * x + a'_{12} * y + a'_{13} * z)/\lambda + t_1;$$

$$y' = (a'_{21} * x + a'_{22} * y + a'_{23} * z)/\lambda + t_2;$$

$$z' = (a'_{31} * x + a'_{32} * y + a'_{33} * z)/\lambda + t_3;$$

by conducting right-shifting by n digits to calculate the coordinates $(x',y',z')^t$.

The twenty-threeth invention for accomplishing the above-described objective is, in the above-described twenty-twoth invention, characterized in that, in the information processing apparatus, said program further comprises a step of adding a constant λ/2 to each number to be divided before conducting said right-shifting by n digits.

The twenty-fourth invention for accomplishing the above-described objective is, in the above-described twenty-oneth, twenty-twoth and twenty-threeth invention, characterized in that, in the information processing apparatus, said program further comprises a step of synthesizing two or more parameters that are multiplied by λ(≠0) in advance.

BRIEF EXPLANATION OF DRAWINGS

FIG. 3 is a flowchart showing an operation of Step 106 more in detail, which is a step of the imaging of a model object.

BEST MODES FOR WORKING THE INVENTION

Figure 1:
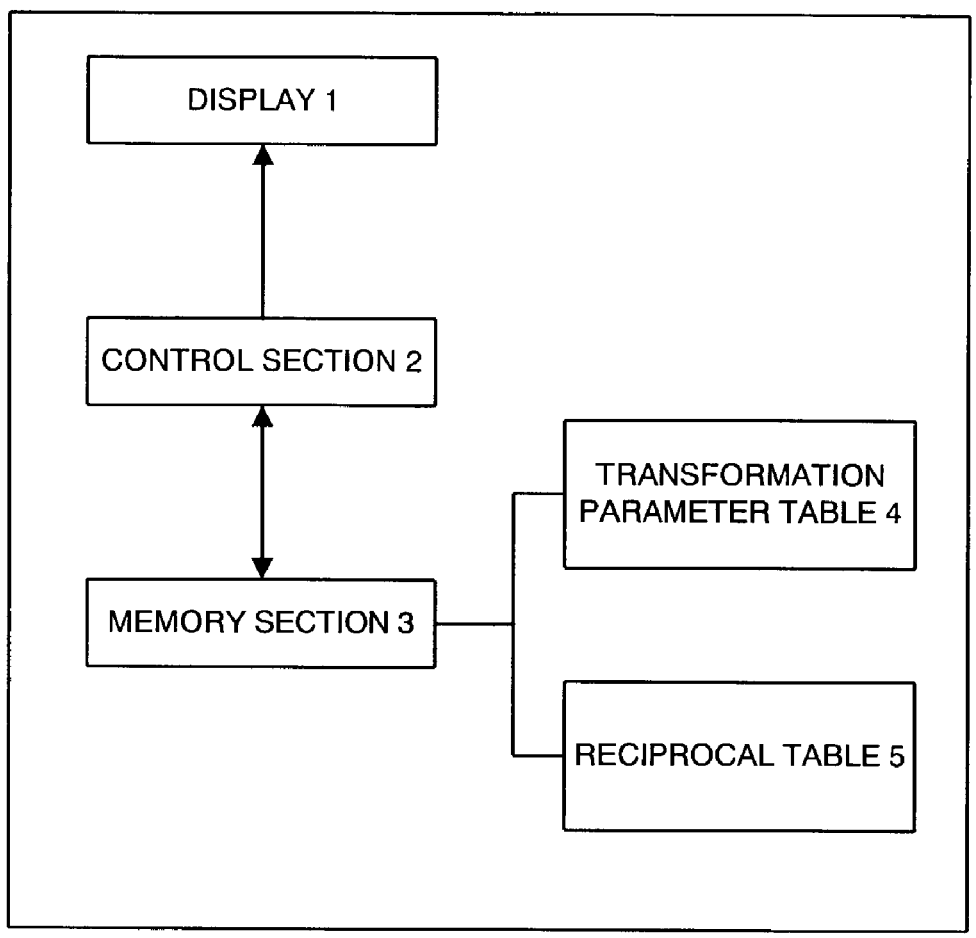
FIG. 1 is a block diagram of a mobile terminal.

The best mode for working the present invention will be explained.

First, geometry calculation by means of an integer, and triangle rasterize in which division calculation is not used, using an information processing apparatus that is a feature of the present invention will be explained.

<Geometry Calculation by Means of an Integer>

1. Coordinate Transformation by Means of an Affine Transformation

When an affine transformation from coordinates $(x,y,z)^t$ into coordinates $(x',y',z')^t$ is represented by a form $$A = \begin{pmatrix} a_{11} & a_{12} & a_{13} \\ a_{21} & a_{22} & a_{23} \\ a_{31} & a_{32} & a_{33} \end{pmatrix} \qquad 1$$

$$\begin{pmatrix} x' \\ y' \\ z' \end{pmatrix} = A \begin{pmatrix} x \\ y \\ z \end{pmatrix} + \begin{pmatrix} t_1 \\ t_2 \\ t_3 \end{pmatrix}, \qquad 2$$

in case that x', y' and z' are obtained by means of numerical operation like C language, they are as follows:

$$x' = a_{11} * x + a_{12} * y + a_{13} * z + t_1;$$

$$y' = a_{21} * x + a_{22} * y + a_{23} * z + t_2;$$

$$z' = a_{31} * x + a_{32} * y + a_{33} * z + t_3;$$

However, all of numeric value types have an infinite range and accuracy.

In case of coordinate calculation is conducted by means of an integer having a finite range, calculation accuracy and operation overflow become an issue.

With regard to the overflow, if a range of the coordinates to be handled is restricted, it does not become an issue, and however, as for the calculation accuracy, when a real number having a small absolute value is rounded off (For a numeric value or the like including a decimal, a value of a place (digit) lower than a place (or digit) at a required right end by one is rounded off to shorten the numeric value. Other than the round-off, round-up and truncation are also available.), a relative error becomes larger. Especially, with regard to the components of the matrix A, there are so many cases where their absolute values are lower than or equal to 1, and in case that their numeric values are rounded off, a result thereof is largely shifted from expected one.

Accordingly, when the components of the matrix A are rounded off to integers, in order to make a relative error small as much as possible, $\lambda(\neq 0)$ is multiplied by the components of the matrix A.

$$A' = \begin{pmatrix} a'_{11} & a'_{12} & a'_{13} \\ a'_{21} & a'_{22} & a'_{23} \\ a'_{31} & a'_{32} & a'_{33} \end{pmatrix} = \lambda A = \begin{pmatrix} \lambda a_{11} & \lambda a_{12} & \lambda a_{13} \\ \lambda a_{21} & \lambda a_{22} & \lambda a_{23} \\ \lambda a_{31} & \lambda a_{32} & \lambda a_{33} \end{pmatrix} \quad 3$$

Coordinate transformation is conducted by means of this matrix A', the calculation is conducted as follows:

$$\begin{pmatrix} x' \\ y' \\ z' \end{pmatrix} = \frac{1}{\lambda} A' \begin{pmatrix} x \\ y \\ z \end{pmatrix} + \begin{pmatrix} t_1 \\ t_2 \\ t_3 \end{pmatrix} \quad 4$$

In case that x', y' and z' are obtained by means of numerical operation like C language, they are obtained as follows:

$x'=(a'_{11}*x+a'_{12}*y+a'_{13}*z)/\lambda+t_1;$ $y'=(a'_{21}*x+a'_{22}*y+a'_{23}*z)/\lambda+t_2;$ $z'=(a'_{31}*x+a'_{32}*y+a'_{33}*z)/\lambda+t_3;$ However, all of numeric value types are integers.

Also in such calculation, it becomes integer calculation, and it is not necessary to conduct floating-point operation, and however, in order to conduct the calculation at a higher speed, to avoid integer division during execution, $\lambda$ is limited to $2^n (n \geq 1)$, and $\lambda'=\log_2 \lambda$ is assumed, and operation almost the same as division is conducted by means of an arithmetic right shift as follows:

$x'=((a'_{11}*x+a'_{12}*y+a'_{13}*z)>>\lambda')+t_1;$ $y'=((a'_{21}*x+a'_{22}*y+a'_{23}*z)>>\lambda')+t_2;$ $z'=((a'_{31}*x+a'_{32}*y+a'_{33}*z)>>\lambda')+t_3;$ Also, in case that the arithmetic right shift is utilized as the integer division, since the round-off is in a $-\infty$ direction, a constant $\lambda/2$ is added before conducting the arithmetic right shift as follows:

$x'=((a'_{11}*x+a'_{12}*y+a'_{13}*z+\lambda/2)>>\lambda')+t_1;$ $y'=((a'_{21}*x+a'_{22}*y+a'_{23}*z+\lambda/2)>>\lambda')+t_2;$ $z'=((a'_{31}*x+a'_{32}*y+a'_{33}*z+\lambda/2)>>\lambda')+t_3;$ and an error is corrected.

This will be explained using a particular example, and for example, a case where an affine transformation is applied to a point of coordinates $(111, 222, 333)^t$ will be considered.

Assuming that the matrices A and $t(t_1, t_2, t_3)^t$ of the above-described equation 2 are $$A = \begin{pmatrix} 0.8901408311 & -0.3213994875 & 0.32300913 \\ 0.3857072937 & 0.9088972746 & -0.1585421959 \\ -0.2426503336 & 0.2657218728 & 0.9330127019 \end{pmatrix}$$

$$t = \begin{pmatrix} 856 \\ 387 \\ 973 \end{pmatrix},$$

a result of the equation 2 when the calculation is conducted using a real number becomes as follows:

$$\begin{pmatrix} x' \\ y' \\ z' \end{pmatrix} = \begin{pmatrix} 0.8901408311 & -0.3213994875 & 0.32300913 \\ 0.3857072937 & 0.9088972746 & -0.1585421959 \\ -0.2426503336 & 0.2657218728 & 0.9330127019 \end{pmatrix}$$

$$\begin{pmatrix} 111 \\ 222 \\ 333 \end{pmatrix} + \begin{pmatrix} 856 \\ 387 \\ 973 \end{pmatrix}$$

$$\approx \begin{pmatrix} 991.0256314 \\ 578.0256314 \\ 1315.749298 \end{pmatrix}$$

Here, as mentioned above, when the affine transformation of the present invention is used, in case that $\lambda=4096(2^{12})$ is assumed, the matrix A' becomes as follows:

$$A' = \begin{pmatrix} 3646 & -1316 & 1323 \\ 1580 & 3723 & -649 \\ -994 & 1088 & 3822 \end{pmatrix}$$

When the affine transformation in which these matrix A' and matrix $t(t_1, t_2, t_3)^t$ are used is represented by equations of C language, it becomes as follows:

int x,y,z;

$x=((3646*111+-1316*222+1323*333+4096/2)$
$\quad >>12)+856;$ $y=((1580*111+3723*222+-649*333+4096/2)>>12)+$
$\quad 387;$ $z=((-994*111+1088*222+3822*333+4096/2)>>12)+$
$\quad 973;$ This calculation result becomes $(991, 579, 1316)^t$, and is almost the same as the above-described operation result of the real number.

In the actual processing of the information processing apparatus, the matrix A' that is obtained by multiplying the matrix A by $\lambda$ and the matrix $t(t_1, t_2, t_3)^t$ are stored in a memory of the information processing apparatus as parameters, and in conducting the coordinate transformation by means of the affine transformation, the matrix A' corresponding to the corresponding matrix A, and the matrix $t(t_1,t_2,t_3)^t$ are read from the memory, and based on the read matrix A', the operation is conducted for each element. And, the right shift is applied to a result thereof, to which a constant $\lambda/2$ is added, constant $\lambda'$ times, and the matrix $t(t_1,t_2,t_3)^t$ is added to a result thereof to calculate the coordinates.

2. Synthesis of Affine Transformations

It is assumed that two affine transformations f and g (transformation parameters) are as follows, respectively:

$$f(p)=Ap+u \qquad 5$$

$$g(p)=Bp+v \qquad 6$$

The synthesis of these two transformations $g \circ f$ is as follows:

$$g \circ f(p)=BAp+Bu+v \qquad 7$$

When $A'=\lambda A$ and $B'=\lambda B$ are given, the following is obtained:

$$g \circ f(p) = \frac{1}{\lambda^2}B'A'p + \frac{1}{\lambda}B'u + v \qquad 8$$

If the followings are assumed, $$M = \frac{1}{\lambda}B'A' \qquad 9$$

$$t = \frac{1}{\lambda}B'u + v \qquad 10$$

the equation 8 becomes as follows:

$$g \circ f(p) = \frac{1}{\lambda}Mp + t \qquad 11$$

The right side of this equation 11 and the right side of the equation 4 have the same form.

Assuming the following equations $$A' = \begin{pmatrix} a_{11} & a_{12} & a_{13} \\ a_{21} & a_{22} & a_{23} \\ a_{31} & a_{32} & a_{33} \end{pmatrix}, u = \begin{pmatrix} u_1 \\ u_2 \\ u_3 \end{pmatrix} \qquad 12$$

$$B' = \begin{pmatrix} b_{11} & b_{12} & b_{13} \\ b_{21} & b_{22} & b_{23} \\ b_{31} & b_{32} & b_{33} \end{pmatrix}, v = \begin{pmatrix} v_1 \\ v_2 \\ v_3 \end{pmatrix} \qquad 13$$

$$M = \begin{pmatrix} m_{11} & m_{12} & m_{13} \\ m_{21} & m_{22} & m_{23} \\ m_{31} & m_{32} & m_{33} \end{pmatrix}, t = \begin{pmatrix} t_1 \\ t_2 \\ t_3 \end{pmatrix}, \qquad 14$$

in case of obtaining the components of M and t by means of the numerical operation like C language, the following is obtained:

for (i=1; i<=3; i++) {for (j=1; j<=3; j++)

$m_{ij}=(b_{i1}*a_{1j}+b_{i2}*a_{2j}+b_{i3}*a_{3j}+\lambda/2)/\lambda;$ $t_i=(b_{i1}*u_1+b_{i2}*u_2+b_{i3}*u_3)/\lambda+v_i;\}$ Assuming that $\lambda$ is limited to $2^n (n \geq 1)$ and $\lambda'=\log_2 \lambda$ is given, and then, all integer types are calculated by integers, the following is obtained:

for (i=1; i<=3; i++) {for (j=1; j<=3; j++)

$m_{ij}=(b_{i1}*a_{1j}+b_{i2}*a_{2j}+b_{i3}*a_{3j}+\lambda/2)>>\lambda';$ $t_i=((b_{i1}*u_1+b_{i2}*u_2+b_{i3}*u_3+\lambda/2)>>\lambda')+v_i;\}$ In accordance with this method, the affine transformations which are multiplied by $\lambda$ in advance can be synthesized.

This will be explained using a particular example, and for example, assuming the followings $$A = \begin{pmatrix} 0.8805527696 & -0.4083871864 & 0.2413463 \\ 0.3599626335 & 0.9063791978 & 0.2211417016 \\ -0.308307837 & -0.1081510783 & 0.9451188401 \end{pmatrix}$$

$$B = \begin{pmatrix} 0.7764762277 & 0.6197856324 & 0.1137999896 \\ -0.527293037 & 0.7379376463 & -0.4212007637 \\ -0.3450314781 & 0.267046438 & 0.8997996883 \end{pmatrix}$$

$$u = \begin{pmatrix} 123 \\ 231 \\ 312 \end{pmatrix}$$

$$v = \begin{pmatrix} 345 \\ 543 \\ 435 \end{pmatrix},$$

and $\lambda=4096$ is assumed, the followings are obtained:

$$\lambda BA \approx \begin{pmatrix} 3570.657414 & 951.7067091 & 1766.883123 \\ -281.8861842 & 3808.232933 & -1481.593097 \\ -1986.998191 & 1169.971053 & 3385.294954 \end{pmatrix}$$

$$Bu + v \approx \begin{pmatrix} 619.1826538 \\ 517.1919145 \\ 734.9863581 \end{pmatrix}$$

Matrices in which the elements of $\lambda A$ and $\lambda B$ ෭are rounded off to the closest integer numbers are as follows:

$$A' = \begin{pmatrix} 3607 & -1673 & 985 \\ 1474 & 3713 & 906 \\ -1263 & -443 & 3871 \end{pmatrix}$$

$$B' = \begin{pmatrix} 3180 & 2539 & 466 \\ -2160 & 3023 & -1725 \\ -1413 & 1094 & 3686 \end{pmatrix}$$

Accordingly, if the matrix M and the matrix t are obtained, they become as follows:

$$M = \begin{pmatrix} 3570 & 952 & 1767 \\ -282 & 3809 & -1481 \\ -1987 & 1170 & 3386 \end{pmatrix}$$

$$t = \begin{pmatrix} 619 \\ 517 \\ 735 \end{pmatrix}$$

In this manner, the values almost the same as the followings calculated as described above can be obtained:

$$\lambda BA \approx \begin{pmatrix} 3570.657414 & 951.7067091 & 1766.883123 \\ -281.8861842 & 3808.232933 & -1481.593097 \\ -1986.998191 & 1169.971053 & 3385.294954 \end{pmatrix}$$

$$Bu + v \approx \begin{pmatrix} 619.1826538 \\ 517.1919145 \\ 734.9863581 \end{pmatrix}$$

<Triangle Rasterize in Which Division is not Used>

In case of obtaining a quantity of a change of x coordinates on a straight line, it is assumed that the coordinates of a point $P_1$ on a two-dimensional plane are $(x_1,y_1)$, and the coordinates of a point $P_2$ are $(x_2,y_2)$. When $y_1 \neq y_2$ is given, the quantity of the change of x coordinates to y coordinates on a straight line that links $P_1$ with $P_2$ is as follows:

$$\Delta x = \frac{x_2 - x_1}{y_2 - y_1}$$

Assuming $\Delta x' = \lambda \Delta x$, in case of obtaining $\Delta x'$ by means of the numerical operation like C language, it becomes as follows:

$\Delta x' = \lambda * (x_2 - x_1)/(y_2 - y_1)$;

And, assuming $$\mu = \frac{\lambda}{y_2 - y_1},$$

it becomes a form of multiplication as follows:

$\Delta x' = \mu * (x_2 - x_1)$;

In case of conducting the calculation by means of an integer only, if $|\lambda|$ is fully large, and $|y_2-y_1|$ is small to some extent, a relative error due to the round-off becomes small.

Accordingly, assuming that $\lambda$ is a constant, if a range of the y coordinates is restricted, it is possible to obtain μ from a small number of arrangement prepared in advance. In other words, μ is stored in a memory of the information processing apparatus in advance in association with $|y_2-y_1|$. And, if μ is read using $|y_2-y_1|$ as an index, and $\Delta x' = \mu * (x_2 - x_1)$;

is calculated, it is possible to obtain $\Delta x'$ almost same as $\Delta x$ by means of multiplication only.

Also, if $\lambda$ is restricted to $2^n (n \geq 1)$, it is possible to calculate $\Delta x$ by means of the arithmetic right shift.

Accordingly, the quantity of the change of the x coordinates can be obtained entirely without division.

Also, with regard to texture coordinates, due to the same reason, the division is not required.

As a particular example, assuming $\lambda=65536$, an example of a line segment between a start point $P_1$ of coordinates (10,20) and a start point $P_2$ of coordinates (85,120) will be explained.

The quantity of a change of x coordinates to y coordinates in this line segment becomes as follows:

$$\Delta x = \frac{85 - 10}{120 - 20} = 0.75,$$

and $\Delta x' = \lambda x = 49152.0$ is obtained.

In case of calculating $\Delta x'$ by means of an integer only without division, as mentioned above, corresponding μ is read from the memory using 120−20=100 as an index.

In this case, assuming $$\mu = \frac{\lambda}{120 - 20} \approx 655,$$

the following is obtained:

$\Delta x' = \mu \times (85-10) = 49125,$ and it is possible to obtain a value almost the same as $\Delta x' = \lambda x = 49152.0$ obtained by using division.

Next, the above-mentioned method will be explained in a case where it is used for a mobile terminal and so forth.

FIG. 1 is a block diagram of a mobile terminal.

In FIG. 1, 1 is a display for displaying three-dimensional graphics, 2 is a control section that is calculation means constructed of a CPU or the like which does not have an FPU (floating-point processing unit), and 3 is a memory section in which a program or a data is stored.

In addition, in the memory section 3, a transformation parameter table 4 in which transformation parameters (the above-mentioned matrix A' and matrix $t(t_1,t_2,t_3)^t$) are stored, and a reciprocal table 5 in which A is stored using the above-mentioned $|y_2-y_1|$ as an index are stored.

In the imaging of the three-dimensional graphics of this explanation below, an object is represented by a combination of planes of every polygon. And, the polygon is called a polygon. An object (polygon) in three-dimensional space has three coordinate values of X, Y, Z. By moving these coordinates, it is possible to change a position and a direction of the object. Further, in order to finally display the object represented by means of three-dimensional coordinates on a two-dimensional screen, a transformation into a screen coordinate system is conducted.

Such processing (calculation) likes a series of a coordinate transformation, a perspective transformation, light source calculation or the like is called geometry calculation. And, the polygon which has been transformed by means of the calculation is finally written in a frame buffer, and imaging is conducted.

Usually, although the processing of the geometry calculation is conducted utilizing the FPU (floating-point processing unit) of the CPU, the FPU is designed for not only the geometry calculation but also the calculation of a general floating-point. Further, in instruments represented by a mobile telephone, there are many ones which do not have the FPU (floating-point processing unit) due to a reason that they become expensive.

Accordingly, even in an information processing apparatus, such as a mobile terminal, of a CPU which does not have the FPU (floating-point processing unit), in order to make it possible to conduct the geometry calculation, the control section 3 conducts the geometry calculation by means of an integer in the present invention.

Also, with regard to rasterize for dividing an object into dots, in a mobile terminal which does not have a 3D graphics accelerator, a processing load increases.

Accordingly, in the present invention, in order to reduce the processing load, the control section 3 rasterizes a triangle without using division.

Next, an imaging operation of the three-dimensional graphics using the above-mentioned calculation, which is conducted by the control section 3, will be explained.

Figure 2:
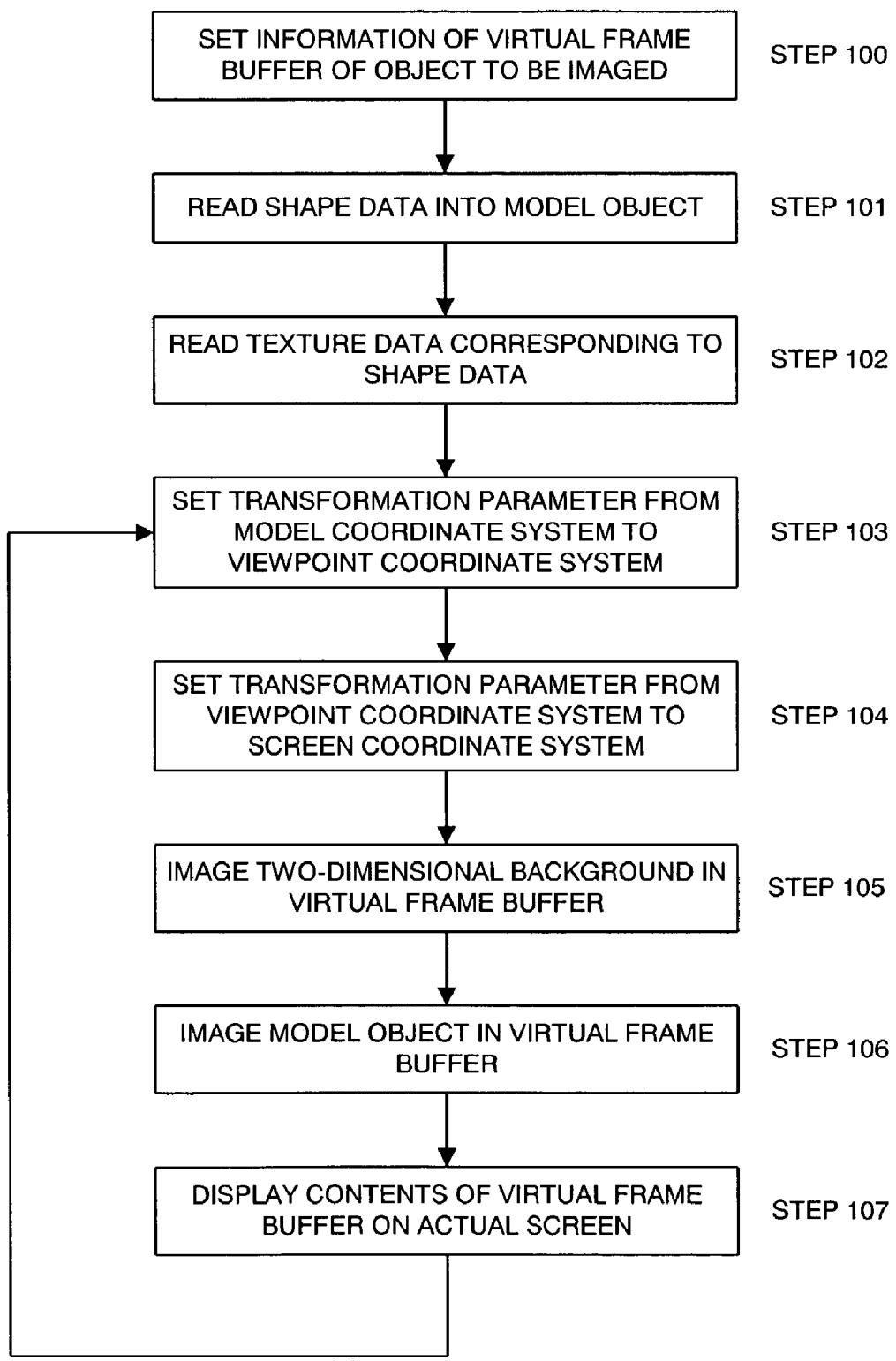
FIG. 2 is a flowchart showing a basic imaging operation of three-dimensional graphics.

FIG. 2 is a flowchart showing a basic imaging operation of three-dimensional graphics.

First, information of a virtual frame buffer of an object to be imaged is set (Step 100).

Next, a shape data that is a geometric coordinate data is read from the memory section 3 into a model object (Step 101).

In the shape data read here, the information of an vertex coordinate row, a polygon row and a segment row is included. Also, in the data of the segment, transformation parameters for a basic posture, an attached vertex group and ID (identification information) of a parent segment are included.

In addition, the transformation parameters to be read are the matrix A' obtained by multiplying the basic matrix A by $\lambda(2^n (n \geq 1))$, and the matrix $t(t_1,t_2,t_3)^t$, and the matrix A' and the matrix $t(t_1,t_2,t_3)^t$ are read from the transformation parameter table 4.

Successively, a texture data corresponding to the shape data, such as a data for the feel of quality and so forth, is read (Step 102).

And, a transformation parameter from a model coordinate system to a viewpoint coordinate system is set (Step 103), and a transformation parameter from the viewpoint coordinate system to a screen coordinate system is set (Step 104).

A two-dimensional background is imaged in a virtual frame buffer (Step 105).

The model object is imaged in the virtual frame buffer (Step 106).

Finally, the contents of the virtual frame buffer are displayed on an actual screen (Step 107).

And, by repeating Step 103 to Step 107, the three-dimensional graphics are imaged.

Successively, Step 106 at which the control section 3 images the model object will be further explained in detail, in which the calculation that is a feature of the present invention is used.

FIG. 3 is a flowchart showing an operation of Step 106 more in detail, which is a step of the imaging of the model object.

First, the vertex coordinates of the model are transformed into the screen coordinate system from a local coordinate system (Step 200).

Here, a structure of the model will be explained. Usually, the model has a plurality of segments therein, and each segment has a plurality of vertexes. These vertexes have coordinate values in a segment coordinate system. The segment can have a plurality of child segments, and has a transformation parameter for transforming the coordinates of the vertexes included in the segment into a parent segment coordinate system. The transformation parameter that the segment of a highest rank has becomes a value for transforming the coordinates of the vertexes included in the segment into the model coordinate system. Also, it has information of a transformation parameter for a basic posture.

Accordingly, to transform the vertex coordinates of the model, which have coordinate values in the segment coordinate system, into the screen coordinate system from the local coordinate system, first a transformation into the model coordinate system from the segment coordinate system is conducted.

The calculation of the transformation parameter from the segment coordinate system to the model coordinate system is conducted by means of the synthesis of the affine transformation by the above-mentioned geometry calculation by means of an integer.

In case of the segment which has the parent segment, a transformation parameter f that the segment has, and a transformation parameter g from the segment coordinate system of the parent segment to the model coordinate system are synthesized, and a transformation parameter $h = g \circ f$ from the segment coordinate system to the model coordinate system is generated.

In this synthesis, the above-mentioned method of the synthesis of the affine transformation is used.

In addition, in case of the segment which does not have the parent segment, assuming that a transformation parameter that the segment has is f, a transformation parameter from the segment coordinate system to the model coordinate system becomes $h = f$.

Successively, a transformation from the model coordinate system to the screen coordinate system will be explained.

A transformation parameter from the model coordinate system to the screen coordinate system is also calculated by the same method.

Assuming that a transformation parameter from the model coordinate system to the viewpoint coordinate system is p, and that a transformation parameter from the viewpoint coordinate system to the screen coordinate system is q, a transformation parameter from the model coordinate system to the screen coordinate system becomes $r = q \circ p$.

Finally, based on the transformation parameter h from the segment coordinate system to the model coordinate system and the transformation parameter r from the model coordinate system to the screen coordinate system, which were calculated as mentioned above, a transformation parameter s from the segment coordinate system to the screen coordinate system is calculated.

Same as the above-mentioned synthesis, the transformation parameter s from the segment coordinate system to the screen coordinate system becomes $s = r \circ h$. Although h is required to be calculated for each segment, the calculation of r is required only one time for the calculation of a one-body model.

Using the transformation parameter s calculated in this manner, the vertex coordinates in the segment coordinate system is transformed into coordinates in the screen coordinate system.

The calculation of the coordinate transformation is conducted by means of the above-mentioned coordinate transformation by the affine transformation of the geometry calculation by means of an integer.

In other words, the vertex coordinates $(x,y,z)^t$ of the segment coordinate system are transformed into coordinates $(x',y',z')^t$ in the screen coordinate system using the transformation parameter s.

Successively, polygons on a reverse side in screen space are removed from an object to be processed (Step 201).

Polygons to be processed are sorted according to a Z value (depth) in the viewpoint coordinate system (Step 202).

Finally, the polygons are imaged in the virtual frame buffer by means of the screen coordinate system (Step 203).

This step will be explained further in detail, and first, here, a possibility that a triangle is displayed in an imaging region will be checked. In case that the triangle is completely out of the imaging region, later imaging processing is skipped.

And, a numeric value for scanning the triangle is calculated in advance. In this calculation, a quantity of a change of edge line coordinates of the triangle, texture coordinates or the like is mainly calculated. This quantity of the change is calculated by the above-mentioned triangle rasterize without using division.

In the scanning of the triangle, a simple operation such as addition and a bit shift is repeated, and a pixel value is written in the virtual frame buffer.

With regard to a particular calculation method, in case that a quantity of a change of coordinates x on a straight line is obtained, it is assumed that coordinates of a point $P_1$ on a two-dimensional plane are $(x_1,y_1)$, and coordinates of a point $P_2$ are $(x_2,y_2)$. When $y_1 \neq y_2$, the quantity of the change of the coordinates x to the coordinates y on a straight line that links $P_1$ with $P_2$ is, as mentioned above, as follows:

$$\Delta x = \frac{x_2 - x_1}{y_2 - y_1}$$

Assuming $\Delta x' = \lambda \Delta x$, in case of obtaining $\Delta x'$ by means of the numerical operation like C language, it becomes as follows:

$$\Delta x' = \lambda * (x_2 - x_1)/(y_2 - y_1);$$

And, given $$\mu = \frac{\lambda}{y_2 - y_1},$$

it becomes a form of multiplication as follows:

$$\Delta x' = \mu * (x_2 - x_1);$$

In case of conducting the calculation by means of an integer only, if $|\lambda|$ is fully large and $|y_2-y_1|$ is small to some extent, a relative error due to the round-off becomes small.

Accordingly, assuming that $\lambda$ is a constant, if a range of y coordinates is restricted, it is possible to obtain $\mu$ from a small number of arrangement.

Then, a value of $\mu$, an index of which is $|y_2-y_1|$, is stored in the reciprocal table 5 of the memory section 3 in advance. And, $\mu$ corresponding to $|y_2-y_1|$ is read from the reciprocal table 5, and by conducting division of these $\mu$ and $(x_2-x_1)$, $\Delta x'$ is calculated.

And, to conduct the processing at a higher speed, necessary calculation is conducted by $\Delta x'$, and it is divided by $\lambda$ when a pixel value is written in the virtual frame buffer.

Also, at a step of the division, if it is assumed that $\lambda$ is $2^n (n \geq 1)$, $\Delta x$ can be calculated by means of the arithmetic right shift, and without using division, it becomes possible to obtain the quantity of the change of the x coordinates.

In addition, the same processing can be also applied to the texture coordinates.

Next, as an actual particular example of the present invention, a program described by means of C language, which is executed by the control section 3, will be explained.

First, a program for the geometry calculation by means of an integer will be described below.

Described below is an example of the transformation parameters, namely the matrix A' and the matrix $(t_1,t_2,t_3)^t$, which are stored in the memory.

```
/** Geometry calculation by means of an integer
 *
 * λ = 4096 is assumed
 */
public class Atrans3i {
    public int m00;      // corresponding to a'11
    public int m01;      // corresponding to a'12
    public int m02;      // corresponding to a'13
    public int m03;      // corresponding to t'1
    public int m10;      // corresponding to a'21
    public int m11;      // corresponding to a'22
    public int m12;      // corresponding to a'23
    public int m13;      // corresponding to t'2
    public int m20;      // corresponding to a'31
    public int m21;      // corresponding to a'32
    public int m22;      // corresponding to a'33
    public int m23;      // corresponding to t'3
```

Here, as comments are made, public int m00 to public int m23 correspond to each element of the matrix A' for the affine transformation and the matrix $(t_1,t_2,t_3)^t$. Also, it is assumed that $\lambda$=4096.

Next, a coordinate transformation will be shown below.

```
/** Coordinate transformation
 *
 * @param src Point of a transformation source
 * @param dst Point of a transformation result
 */
public void transPoint(Vec3i src, Vec3i dst)
{
    int x = ((m00 * src.x + m01 * src.y + m02 *
src.z + 2048) >> 12) + m03;
    int y = ((m10 * src.x + m11 * src.y + m12 *
src.z + 2048) >> 12) + m13;
    int z = ((m20 * src.x + m21 * src.y + m22 *
src.z + 2048) >> 12) + m23;
    dst.x = x; dst.y = y; dst.z = z;
    return;
}
```

Here, @param src corresponds to the coordinates $(x,y,z)^t$ shown in the above-described equation 2, and @param dst corresponds to the coordinates $(x',y',z')^t$ shown in the above-described equation 2.

Next, the synthesis of the affine transformation will be shown below.

```
/** synthesis of affine transformation
 *
 * @param t1 Affine transformation of left side
 * @param t2 Affine transformation of right side
 */
public void multiply( Atrans3i t1, Atrans3i
t2 ) {
    int a00 = (t1.m00 * t2.m00 + t1.m01 * t2.m10
```

```
              + t1.m02 * t2.m20 + 2048) >> 12;
          int a01 = (t1.m00 * t2.m01 + t1.m01 * t2.m11
              + t1.m02 * t2.m21 + 2048) >> 12;
          int a02 = (t1.m00 * t2.m02 + t1.m01 * t2.m12
              + t1.m02 * t2.m22 + 2048) >> 12;
          int a03 = ((t1.m00 * t2.m03 + t1.m01 *
t2.m13 + t1.m02 * t2.m23 + 2048) >> 12) + t1.m03;
          int a10 = (t1.m10 * t2.m00 + t1.m11 * t2.m10
              + t1.m12 * t2.m20 + 2048) >> 12;
          int a11 = (t1.m10 * t2.m01 + t1.m11 * t2.m11
              + t1.m12 * t2.m21 + 2048) >> 12;
          int a12 = (t1.m10 * t2.m02 + t1.m11 * t2.m12
              + t1.m12 * t2.m22 + 2048) >> 12;
          int a13 = ((t1.m10 * t2.m03 + t1.m11 *
t2.m13 + t1.m12 * t2.m23 + 2048) >> 12) + t1.m13;
          int a20 = (t1.m20 * t2.m00 + t1.m21 * t2.m10
              + t1.m22 * t2.m20 + 2048) >> 12;
          int a21 = (t1.m20 * t2.m01 + t1.m21 * t2.m11
              + t1.m22 * t2.m21 + 2048) >> 12;
          int a22 = (t1.m20 * t2.m02 + t1.m21 * t2.m12
              + t1.m22 * t2.m22 + 2048) >> 12;
          int a23 = ((t1.m20 * t2.m03 + t1.m21 *
t2.m13 + t1.m22 * t2.m23 + 2048) >> 12) + t1.m23;
          m00 = a00; m01 = a01; m02 = a02; m03 = a03;
          m10 = a10; m11 = a11; m12 = a12; m13 = a13;
          m20 = a20; m21 = a21; m22 = a22; m23 = a23;
          return;
      }
  }
  Next, the polygon imaging will be shown.
  /** Polygon imaging
  *
  * λ = 65536 is assumed
  */
  public class Polydraw {
      /** Polygon vertex information */
      static final class Vertex {
          int x;      // Pixel X coordinates
          int y;      // Pixel Y coordinates
          int u;      // Texel U coordinates
          int v;      // Texel V coordinates
      }
      // Internal constant
      private final static int SFT = 16;
      private final static int TEXHMASK = 0x7F0000;
      private final static int TEXWMASK = 0x7F;
      private final static int TEXPSHIFT = 0x09;
      // Table of μ-1
      private static final short __inverse_tbl[] = {
          0x0000, (short)0xffff, 0x7fff, 0x5554,
0x3fff, 0x3332, 0x2aa9, 0x2491,
          0x1fff, 0x1c70, 0x1998, 0x1744, 0x1554,
0x13b0, 0x1248, 0x1110,
          0x0fff, 0x0f0e, 0x0e37, 0x0d78, 0x0ccb,
0x0c2f, 0x0ba1, 0x0b20,
          0x0aa9, 0x0a3c, 0x09d7, 0x097a, 0x0923,
0x08d2, 0x0887, 0x0841,
          0x07ff, 0x07c0, 0x0786, 0x074f, 0x071b,
0x06ea, 0x06bb, 0x068f,
          0x0665, 0x063d, 0x0617, 0x05f3, 0x05d0,
0x05af, 0x058f, 0x0571,
          0x0554, 0x0538, 0x051d, 0x0504, 0x04eb,
0x04d3, 0x04bc, 0x04a6,
          0x0491, 0x047c, 0x0468, 0x0455, 0x0443,
0x0431, 0x0420, 0x040f,
          0x03ff, 0x03ef, 0x03df, 0x03d1, 0x03c2,
0x03b4, 0x03a7, 0x039a,
          0x038d, 0x0380, 0x0374, 0x0368, 0x035d,
0x0352, 0x0347, 0x033c,
          0x0332, 0x0328, 0x031e, 0x0314, 0x030b,
0x0302, 0x02f9, 0x02f0,
          0x02e7, 0x02df, 0x02d7, 0x02cf, 0x02c7,
0x02bf, 0x02b8, 0x02b0,
          0x02a9, 0x02a2, 0x029b, 0x0294, 0x028e,
0x0287, 0x0281, 0x027b,
          0x0275, 0x026f, 0x0269, 0x0263, 0x025d,
0x0258, 0x0252, 0x024d,
          0x0248, 0x0242, 0x023d, 0x0238, 0x0233,
0x022f, 0x022a, 0x0225,
          0x0221, 0x021c, 0x0218, 0x0213, 0x020f,
0x020b, 0x0207, 0x0203
      };
```

In addition, although the above-described table corresponds to the above-mentioned reciprocal table 5 of a value of μ, from a memory storage capacity saving point of view, μ−1 is assumed. And, it forms a line in order of magnitude of $|y_2-y_1|$.

```
      //Virtual frame buffer information
      private byte scr_image[];  // Top address of
virtual frame buffer
      private int scr_width;     // Lateral pixel number
of frame buffer
      private int scr_height;    // Vertical pixel
number of frame buffer
      private int scr_pitch;     // Scan line strand
      private int scr_offset;    // Address off-set
      // Texture image information
      private byte tex_image[];  // Top address of
texel data
      private Texture texture;   // Texture
      private int tex_width;     // Width of texture
      private int tex_height;    // Hight of texture
      // Clip information
      private int clip_left;     // Left clip
position
      private int clip_top;      // Upper clip
position
      private int clip_right;    // Right clip
position
      private int clip_bottom;   // Lower clip
position
      /** Imaging of triangle */
      void drawTriangle( Polydraw.Vertex v0,
Polydraw.Vertex v1, Polydraw.Vertex v2 ) {
          /* Clipping (code omitted) */
          boolean inside;
          /* Sort three points (code omitted) */
          int top_x, top_y, top_u, top_v;
          int mid_x, mid_y, mid_u, mid_v;
          int bot_x, bot_y, bot_u, bot_v;
          /* Three points on a line */
          if ( top_y == bot_y )
              return;
          /* Scan start point */
          int scan_scr_y = top_y;
          int pixel = scan_scr_y * scr_pitch +
scr_offset;
          int dist_scr_x, dist_scr_y;
          int tb_scr_x, tm_scr_x, mb_scr_x;
          int tb_scr_dx, tm_scr_dx, mb_scr_dx;
          int dist_tex_u, dist_tex_v;
          int tb_tex_u, tb_tex_v, tm_tex_u, tm_tex_v,
mb_tex_u, mb_tex_v;
          int tb_tex_du, tb_tex_dv, tm_tex_du,
tm_tex_dv, mb_tex_du, mb_tex_dv;
          /* top-bot */
          dist_scr_x = bot_x - top_x;
          dist_scr_y = inverse16( bot_y - top_y );
          tb_scr_dx = dist_scr_x * dist_scr_y; // X
gradient of top-bot (how to obtain Δx')
          tb_scr_x = top_x << SFT; // X on top-bot
          /* top-bot of texture */
          dist_tex_u = bot_u - top_u; (how to obtain
Δx')
          dist_tex_v = bot_v —top_v; (how to obtain
Δx')
          tb_tex_du = dist_tex_u * dist_scr_y;
          tb_tex_dv = dist_tex_v * dist_scr_y;
          tb_tex_u = top_u << SFT; // U on top-bot
          tb_tex_v = top_v << SFT; // V on top-bot
          /* top-mid */
          dist_scr_x = mid_x - top_x;
          dist_scr_y = mid_y - top_y;
```

```
                dist_tex_u = mid_u - top_u;
                dist_tex_v = mid_v - top_v;
                /* dx, dy top-bot for texture scan->mid */
                int scan_tex_du, scan_tex_dv;
                int width = dist_scr_x - ((tb_scr_dx *
dist_scr_y) >> SFT);
                if ( width != 0 ) {
                    int inv_width = inverse16( width );//
horizontal scan U gradient (how to obtain Δx')
                    scan_tex_du = (dist_tex_u - ((tb_tex_du
* dist_scr_y) >> SFT)) * inv_width; // horizontal
scan v gradient (how to obtain Δx')
                    scan_tex_dv = (dist_tex_v - ((tb_tex_dv
* dist_scr_y) >> SFT)) * inv_width;
                }
                else
                    return;
                /* top-mid */
                int scr_end, scr_dd;
                if ( dist_scr_y > 0 ) {
                    /* There is an upper triangle */
                    dist_scr_y = inverse16( dist_scr_y );
                    tm_scr_dx = dist_scr_x * dist_scr_y;// x
gradient of top-mid (how to obtain Δx')
                    tm_scr_x = tb_scr_x; // X on top-mid
                    /* top-mid of texture */
                    tm_tex_du = dist_tex_u * dist_scr_y; //
U gradient of top-mid (how to obtain Δx')
                    tm_tex_dv = dist_tex_v * dist_scr_y; //
v gradient on top-mid (how to obtain Δx')
                    tm_tex_u = tb_tex_u; // U gradient on
top-mid
                    tm_tex_v = tb_tex_v; // V gradient on
top-mid
                    if ( width > 0 ) { // top-bot is left
                        if ( inside ) {
                            while ( scan_scr_y < mid_y ) {
                                int p1 = (tb_scr_x >> SFT) +
pixel;
                                int p2 = (tm_scr_x >> SFT) +
pixel;
                                int tpx = tb_tex_u;
                                int tpy = tb_tex_v;
                                while( p1 < p2 ) {
                                    int tidx = ((tpy &
TEXHMASK) >>> TEXPSHIFT) + ((tpx >>> SFT) &
TEXWMASK);
                                    scr_image[p1]=tex_image[tidx];//Write one pixel
                                    tpx += scan_tex_du;
                                    tpy += scan_tex_dv;
                                    p1++;
                                }
                                scan_scr_y++;
                                pixel += scr_pitch;
                                tb_scr_x += tb_scr_dx;
                                tm_scr_x += tm_scr_dx;
                                tb_tex_u += tb_tex_du;
                                tb_tex_v += tb_tex_dv;
                            }
                        }
                        else { /* Code omitted */ }
                    }
                    else { /* top-mid is left (code omitted)
*/ }
                }
                /* Bottom is horizontal */
                if ( mid_y == bot_y )
                    return;
                /* mid-bot */
                dist_scr_x = bot_x - mid_x;
                dist_scr_y = inverse16( bot_y - mid_y );
                mb_scr_dx = dist_scr_x * dist_scr_y; //
gradient of mid-bot
                mb_scr_x = mid_x << SFT; // X on mid-bot
                if ( width > 0 ) { // top-bot is left
                    if ( inside ) {
                        while ( scan_scr_y < bot_y ) {
                            int p1 = (tb_scr_x >> SFT) +
pixel;
                            int p2 = (mb_scr_x >> SFT) +
pixel;
                            int tpx = tb_tex_u;
                            int tpy = tb_tex_v;
                            while ( p1 < p2 ) {
                                int tidx = ((tpy & TEXHMASK)
>>> TEXPSHIFT) + ((tpx >>> SFT) & TEXWMASK);
                                scr_image[p1] =
tex_image[tidx]; //Write one pixel
                                tpx += scan_tex_du;
                                tpy += scan_tex_dv;
                                p1++;
                            }
                            scan_scr_y++;
                            pixel += scr_pitch;
                            tb_scr_x += tb_scr_dx;
                            mb_scr_x += mb_scr_dx;
                            tb_tex_u += tb_tex_du;
                            tb_tex_v += tb_tex_dv;
                        }
                    }
                    else { /* code omitted */ }
                }
                else { /* mid-bot is left (code omitted)
*/ }
                return;
            }
    /**Calculate μ
     *
     * @param num denominator (-32767..-1,
1..32767)
     * @return μ=λ/num
     */
    private static int inverse16( int num ) {
        boolean posi_flg = (num >= 0);
        int denom = posi_flg ? num : -num;
        if ( denom < 128 ) {
            int val = (_inverse_tbl[denom] & 0xffff)
+ 1;
            return posi_flg ? val : -val;
        }
        int x = 32768*128;
        int y = denom << 15;
        { int s = x - y; x = (s >= 0) ? (s << 1) +
1 : x << 1; }
        { int s = x - y; x = (s >= 0) ? (s << 1) +
1 : x << 1; }
        { int s = x - y; x = (s >= 0) ? (s << 1) +
1 : x << 1; }
        { int s = x - y; x = (s >= 0) ? (s << 1) +
1 : x << 1; }
        { int s = x - y; x = (s >= 0) ? (s << 1) +
1 : x << 1; }
        { int s = x - y; x = (s >= 0) ? (s << 1) +
1 : x << 1; }
        { int s = x - y; x = (s >= 0) ? (s << 1) +
1 : x << 1; }
        { int s = x - y; x = (s >= 0) ? (s << 1) +
1 : x << 1; }
        int r = (x >> 15);
        X <<= 1;
        if ( denom <= r )
            x++;
        x &= 0xffff
        return posi_flg ? x : -x;
    }
}
```

The above is one example of the program for working the present invention.

INDUSTRIAL AVAILABILITY

In the present invention, since in the calculation processing for the imaging of a three-dimensional image, the calculation processing can be conducted within a range of an integer, the three-dimensional image can be handled even though the FPU (floating-point processing unit) is not provided like in a mobile telephone and PDA (Personal Digital (Data) Assistants).

Also, since division having a high processing load is not conducted in the calculation processing, smooth imaging processing can be conducted even in an information processing apparatus which has low capacity of a CPU.

The invention claimed is:

1. An information processing apparatus for, in conducting Rasterize processing of imaging of a three-dimensional image, calculating a quantity of a change of x coordinates $$\Delta x = \frac{x_2 - x_1}{y_2 - y_1}$$

to y coordinates of a straight line passing through a point $P_1(x_1,y_1)$ and a point $P_2(x_2,y_2)$ on a two-dimensional plain, characterized in that the apparatus comprises:

a memory in which a constant μ representative of $$\mu = \frac{\lambda}{y_2 - y_1}$$

is stored in association with the quantity of the change of the y coordinates; and calculation means for, in calculating Δx, reading μ corresponding to the quantity of the change of said y coordinates from said memory, and calculating $$\Delta x' = \mu*(x_2-x_1);$$

by means of multiplication, and calculating this result as Δx.

2. An information processing apparatus recited in claim 1, characterized in that said λ is limited to $2^n (n \geq 1)$, and the apparatus further comprises means for calculating Δx by right-shifting said calculated Δx' by n digits.

3. An information processing apparatus recited in claim 1 or claim 2, wherein coordinate values are limited to integers, and transformation processing is applied to coordinates $(x,y,z)^t$ to create coordinates $(x',y',z')^t$ by means of an affine transformation representative of $$\begin{pmatrix} x' \\ y' \\ z' \end{pmatrix} = A \begin{pmatrix} x \\ y \\ z \end{pmatrix} + \begin{pmatrix} t_1 \\ t_2 \\ t_3 \end{pmatrix},$$

characterized in that the apparatus further comprises:

a memory in which a matrix $$A' = \begin{pmatrix} a'_{11} & a'_{12} & a'_{13} \\ a'_{21} & a'_{22} & a'_{23} \\ a'_{31} & a'_{32} & a'_{33} \end{pmatrix} = \lambda A = \begin{pmatrix} \lambda a_{11} & \lambda a_{12} & \lambda a_{13} \\ \lambda a_{21} & \lambda a_{22} & \lambda a_{23} \\ \lambda a_{31} & \lambda a_{32} & \lambda a_{33} \end{pmatrix}$$

that is obtained by multiplying an affine transformation matrix $$A = \begin{pmatrix} a_{11} & a_{12} & a_{13} \\ a_{21} & a_{22} & a_{23} \\ a_{31} & a_{32} & a_{33} \end{pmatrix}$$

by $\lambda(\neq 0)$, a matrix $(t_1,t_2,t_3)^t$, and a shape data are stored; and calculation means for, in transforming the coordinates $(x,y,z)^t$ of said shape data into the coordinates $(x',y',z')^t$ by means of an affine transformation of the matrix A and the matrix $(t_1,t_2,t_3)^t$, reading the matrix A' and the matrix $(t_1,t_2,t_3)^t$ from said memory, and calculating $$x'=(a'_{11}*x+a'_{12}*y+a'_{13}*z)/\lambda+t_1;$$

$$y'=(a'_{21}*x+a'_{22}*y+a'_{23}*z)/\lambda+t_2;$$

$$z'=(a'_{31}*x+a'_{32}*y+a'_{33}*z)/\lambda+t_3;$$

to calculate the coordinates $(x',y',z')^t$.

4. An information processing apparatus recited in claim 3, characterized in that said λ is limited to $2^n (n \geq 1)$, and said calculation means is means for calculating divisional calculation of $$x'=(a'_{11}*x+a'_{12}*y+a'_{13}*z)/\lambda+t_1;$$

$$y'=(a'_{21}*x+a'_{22}*y+a'_{23}*z)/\lambda+t_2;$$

$$z'=(a'_{31}*x+a'_{32}*y+a'_{33}*z)/\lambda+t_3;$$

by conducting right-shifting by n digits.

5. An information processing apparatus recited in claim 4, characterized in that said calculation means is means for conducting the calculation by conducting right-shifting by n digits after adding a constant λ/2 to each number to be divided.

6. An information processing apparatus recited in claim 3, characterized in that the apparatus comprises synthesis means for synthesizing two or more parameters that are multiplied by $\lambda(\neq 0)$ in advance.

7. An information processing apparatus recited in claim 4, characterized in that the apparatus comprises synthesis means for synthesizing two or more parameters that are multiplied by $\lambda(\neq 0)$ in advance.

8. An information processing apparatus recited in claim 5, characterized in that the apparatus comprises synthesis means for synthesizing two or more parameters that are multiplied by $\lambda(\neq 0)$ in advance.

9. An imaging processing method of, in conducting Rasterize processing of imaging of a three-dimensional image, calculating a quantity of a change of x coordinates $$\Delta x = \frac{x_2 - x_1}{y_2 - y_1}$$

to y coordinates of a straight line passing through a point $P_1(x_1,y_1)$ and a point $P_2(x_2,y_2)$ on a two-dimensional plain, characterized in that said method comprises steps of:

in calculating $\Delta x$, reading $\mu$ corresponding to a quantity of a change of y coordinates of $\Delta x$ to be calculated, from a memory in which the constant $\mu$ representative of $$\mu = \frac{\lambda}{y_2 - y_1}$$

is stored in association with the quantity of the change of the y coordinates; and based on said $\mu$ that was read, calculating $$\Delta x' = \mu * (x_2 - x_1);$$

by means of multiplication, and calculating this result as $\Delta x$.

10. An imaging processing method recited in claim 9, characterized in that, said $\lambda$ is limited to $2^n (n \geq 1)$, and the method further comprises a step of calculating $\Delta x$ by right-shifting said calculated $\Delta x'$ by n digits.

11. An imaging processing method recited in claim 9 or claim 10, in which coordinate values are limited to integers, and transformation processing is applied to coordinates $(x,y,z)^t$ to create coordinates $(x',y',z')^t$ by means of an affine transformation representative of $$\begin{pmatrix} x' \\ y' \\ z' \end{pmatrix} = A \begin{pmatrix} x \\ y \\ z \end{pmatrix} + \begin{pmatrix} t_1 \\ t_2 \\ t_3 \end{pmatrix},$$

characterized in that the method comprises steps of:

in transforming the coordinates $(x,y,z)^t$ of a shape data into the coordinates $(x',y',z')^t$ by means of an affine transformation of a matrix A and a matrix $(t_1,t_2,t_3)^t$, reading a parameter A'

$$A' = \begin{pmatrix} a'_{11} & a'_{12} & a'_{13} \\ a'_{21} & a'_{22} & a'_{23} \\ a'_{31} & a'_{32} & a'_{33} \end{pmatrix} = \lambda A = \begin{pmatrix} \lambda a_{11} & \lambda a_{12} & \lambda a_{13} \\ \lambda a_{21} & \lambda a_{22} & \lambda a_{23} \\ \lambda a_{31} & \lambda a_{32} & \lambda a_{33} \end{pmatrix}$$

that is obtained by multiplying the matrix A by $\lambda (\neq 0)$, and the matrix $(t_1,t_2,t_3)^t$, which are stored in a memory; and based on said read matrix A' and matrix $(t_1,t_2,t_3)^t$, calculating $$x' = (a'_{11}*x + a'_{12}*y + a'_{13}*z)/\lambda + t_1;$$

$$y' = (a'_{21}*x + a'_{22}*y + a'_{23}*z)/\lambda + t_2;$$

$$z' = (a'_{31}*x + a'_{32}*y + a'_{33}*z)/\lambda + t_3;$$

and calculating the coordinates $(x',y',z')^t$.

12. An imaging processing method recited in claim 11, characterized in that said $\lambda$ is limited to $2^n (n \geq 1)$, and said calculating step is a step of calculating division of $$x' = (a'_{11}*x + a'_{12}*y + a'_{13}*z)/\lambda + t_1;$$

$$y' = (a'_{21}*x + a'_{22}*y + a'_{23}*z)/\lambda + t_2;$$

$$z' = (a'_{31}*x + a'_{32}*y + a'_{33}*z)/\lambda + t_3;$$

by conducting right-shifting by n digits to calculate the coordinates $(x',y',z')^t$.

13. An imaging processing method recited in claim 12, characterized in that the method further comprises a step of adding a constant $\lambda/2$ to each number to be divided before conducting said right-shifting by n digits.

14. An imaging processing method recited in claim 11, characterized in that the method further comprises a step of synthesizing two or more parameters that are multiplied by $\lambda (\neq 0)$ in advance.

15. An imaging processing method recited in claim 12, characterized in that the method further comprises a step of synthesizing two or more parameters that are multiplied by $\lambda (\neq 0)$ in advance.

16. An imaging processing method recited in claim 13, characterized in that the method further comprises a step of synthesizing two or more parameters that are multiplied by $\lambda (\neq 0)$ in advance.

17. A program for, in conducting Rasterize processing of imaging of a three-dimensional image, making an information processing apparatus conduct calculation processing for calculating a quantity of a change of x coordinates $$\Delta x = \frac{x_2 - x_1}{y_2 - y_1}$$

to y coordinates of a straight line passing through a point $P_1(x_1,y_1)$ and a point $P_2(x_2,y_2)$ on a two-dimensional plain, characterized in that said program comprises steps of:

in calculating $\Delta x$, reading $\mu$ corresponding to a quantity of a change of y coordinates of $\Delta x$ to be calculated, from a memory in which the constant $\mu$ representative of $$\mu = \frac{\lambda}{y_2 - y_1}$$

is stored in association with the quantity of the change of the y coordinates; and based on said $\mu$ that was read, calculating $$\Delta x' = \mu * (x_2 - x_1);$$

by means of multiplication, and calculating this result as $\Delta x$.

18. A program recited in claim 17, characterized in that, in the information processing apparatus, said $\lambda$ is limited to $2^n (n \geq 1)$, and the program further comprises a step of calculating $\Delta x$ by right-shifting said calculated $\Delta x'$ by n digits.

19. A program recited in claim 17 or claim 18, in making an information processing apparatus apply transformation processing to coordinates $(x,y,z)^t$ to create coordinates $(x',y',z')^t$ by means of an affine transformation representative of $$\begin{pmatrix} x' \\ y' \\ z' \end{pmatrix} = A \begin{pmatrix} x \\ y \\ z \end{pmatrix} + \begin{pmatrix} t_1 \\ t_2 \\ t_3 \end{pmatrix},$$

wherein coordinate values are limited to integers, characterized in that the program comprises steps of:

in transforming the coordinates $(x,y,z)^t$ of the shape data into the coordinates $(x',y',z')^t$ by means of an affine transformation of a matrix A and a matrix $(t_1,t_2,t_3)^t$, reading a parameter A'

$$A' = \begin{pmatrix} a'_{11} & a'_{12} & a'_{13} \\ a'_{21} & a'_{22} & a'_{23} \\ a'_{31} & a'_{32} & a'_{33} \end{pmatrix} = \lambda A = \begin{pmatrix} \lambda a_{11} & \lambda a_{12} & \lambda a_{13} \\ \lambda a_{21} & \lambda a_{22} & \lambda a_{23} \\ \lambda a_{31} & \lambda a_{32} & \lambda a_{33} \end{pmatrix}$$

that is obtained by multiplying the matrix A by $\lambda(\neq 0)$, and the matrix $(t_1,t_2,t_3)^t$, which are stored in a memory; and based on said read matrix A' and matrix $(t_1, t_2, t_3)^t$, calculating $$x'=(a'_{11}*x+a'_{12}*y+a'_{13}*z)/\lambda+t_1;$$

$$y'=(a'_{21}*x+a'_{22}*y+a'_{23}*z)/\lambda+t_2;$$

$$z'=(a'_{31}*x+a'_{32}*y+a'_{33}*z)/\lambda+t_3;$$

to calculate the coordinates $(x',y',z')^t$.

20. A program recited in claim 19, characterized in that, in case that said $\lambda$ is limited to $2^n(n \geq 1)$, said calculating step in said program is a step of, in the information processing apparatus, calculating division of $$x'=(a'_{11}*x+a'_{12}*y+a'_{13}*z)/\lambda+t_1;$$

$$y'=(a'_{21}*x+a'_{22}*y+a'_{23}*z)/\lambda+t_2;$$

$$z'=(a'_{31}*x+a'_{32}*y+a'_{33}*z)/\lambda+t_3;$$

by conducting right-shifting by n digits to calculate the coordinates $(x',y',z')^t$.

21. A program recited in claim 20, characterized in that, in the information processing apparatus, the program further comprises a step of adding a constant $\lambda/2$ to each number to be divided before conducting said right-shifting by n digits.

22. A program recited in claim 19, characterized in that, in the information processing apparatus, the program further comprises a step of synthesizing two or more parameters that are multiplied by $\lambda(\neq 0)$ in advance.

23. A program recited in claim 20, characterized in that, in the information processing apparatus, the program further comprises a step of synthesizing two or more parameters that are multiplied by $\lambda(\neq 0)$ in advance.

24. A program recited in claim 21, characterized in that, in the information processing apparatus, the program further comprises a step of synthesizing two or more parameters that are multiplied by $\lambda(\neq 0)$ in advance.

25. A record medium in which a program for, in conducting Rasterize processing of imaging of a three-dimensional image, making an information processing apparatus conduct calculation processing for calculating a quantity of a change of x coordinates $$\Delta x = \frac{x_2 - x_1}{y_2 - y_1}$$

to y coordinates of a straight line passing through a point $P_1(x_1,y_1)$ and a point $P_2(x_2,y_2)$ on a two-dimensional plain, characterized in that said program comprises steps of:

in calculating $\Delta x$, reading $\mu$ corresponding to a quantity of a change of y coordinates of $\Delta x$ to be calculated, from a memory in which the constant $\mu$ representative of $$\mu = \frac{\lambda}{y_2 - y_1}$$

is stored in association with the quantity of the change of the y coordinates; and based on said $\mu$ that was read, calculating $$\Delta x'=\mu*(x_2-x_1);$$

by means of multiplication, and calculating this result as $\Delta x$.

26. A record medium in which the program is stored recited in claim 25, characterized in that, in the information processing apparatus, said $\lambda$ is limited to $2^n(n \geq 1)$, and the program further comprises a step of calculating $\Delta x$ by right-shifting said calculated $\Delta x'$ by n digits.

27. A record medium in which the program is stored recited in claim 25 or claim 26, in making an information processing apparatus apply transformation processing to coordinates $(x,y,z)^t$ to create coordinates $(x',y',z')^t$ by means of an affine transformation representative of $$\begin{pmatrix} x' \\ y' \\ z' \end{pmatrix} = A \begin{pmatrix} x \\ y \\ z \end{pmatrix} + \begin{pmatrix} t_1 \\ t_2 \\ t_3 \end{pmatrix},$$

wherein coordinate values are limited to integers, characterized in that the program comprises steps of:

in transforming the coordinates $(x,y,z)^t$ of the shape data into the coordinates $(x',y',z')^t$ by means of an affine transformation of a matrix A and a matrix $(t_1,t_2,t_3)^t$, reading a parameter A'

$$A' = \begin{pmatrix} a'_{11} & a'_{12} & a'_{13} \\ a'_{21} & a'_{22} & a'_{23} \\ a'_{31} & a'_{32} & a'_{33} \end{pmatrix} = \lambda A = \begin{pmatrix} \lambda a_{11} & \lambda a_{12} & \lambda a_{13} \\ \lambda a_{21} & \lambda a_{22} & \lambda a_{23} \\ \lambda a_{31} & \lambda a_{32} & \lambda a_{33} \end{pmatrix}$$

that is obtained by multiplying the matrix A by $\lambda(\neq 0)$, and the matrix $(t_1,t_2,t_3)^t$, which are stored in a memory; and based on said read matrix A' and matrix $(t_1,t_2,t_3)^t$, calculating $$x'=(a'_{11}*x+a'_{12}*y+a'_{13}*z)/\lambda+t_1;$$

$$y'=(a'_{21}*x+a'_{22}*y+a'_{23}*z)/\lambda+t_2;$$

$$z'=(a'_{31}*x+a'_{32}*y+a'_{33}*z)/\lambda+t_3;$$

to calculate the coordinates $(x',y',z')^t$.

28. A record medium in which the program is stored recited in claim 27, characterized in that, in case that said $\lambda$ is limited to $2^n(n \geq 1)$, said calculating step in said program is a step of, in the information processing apparatus, calculating division of $$x'=(a'_{11}*x+a'_{12}*y+a'_{13}*z)/\lambda+t_1;$$

$$y'=(a'_{21}*x+a'_{22}*y+a'_{23}*z)/\lambda+t_2;$$

$$z'=(a'_{31}*x+a'_{32}*y+a'_{33}*z)/\lambda+t_3;$$

by conducting right-shifting by n digits to calculate the coordinates $(x',y',z')^t$.

29. A record medium in which the program is stored recited in claim 28, characterized in that, in the information processing apparatus, said program further comprises a step of adding a constant $\lambda/2$ to each number to be divided before conducting said right-shifting by n digits.

30. A record medium in which the program is stored recited in claim 27, characterized in that, in the information processing apparatus, said program further comprises a step of synthesizing two or more parameters that are multiplied by $\lambda(\neq 0)$ in advance.

31. A record medium in which the program is stored recited in claim 28, characterized in that, in the information processing apparatus, said program further comprises a step of synthesizing two or more parameters that are multiplied by $\lambda(\neq 0)$ in advance.

32. A record medium in which the program is stored recited in claim 29, characterized in that, in the information processing apparatus, said program further comprises a step of synthesizing two or more parameters that are multiplied by $\lambda(\neq 0)$ in advance.

* * * * *